United States Patent
Horn et al.

(10) Patent No.: US 8,300,555 B2
(45) Date of Patent: Oct. 30, 2012

(54) MANAGEMENT OF WIRELESS RELAY NODES USING IDENTIFIERS

(75) Inventors: Gavin B. Horn, La Jolla, CA (US); Fatih Ulupinar, San Diego, CA (US); Parag A. Agashe, San Diego, CA (US); Peerapol Tinnakornsrisuphap, San Diego, CA (US); Rajarshi Gupta, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 679 days.

(21) Appl. No.: 12/361,442

(22) Filed: Jan. 28, 2009

(65) Prior Publication Data
US 2009/0190521 A1 Jul. 30, 2009

Related U.S. Application Data

(60) Provisional application No. 61/024,764, filed on Jan. 30, 2008.

(51) Int. Cl.
*H04W 40/30* (2009.01)
(52) U.S. Cl. ............ 370/255; 370/338
(58) Field of Classification Search .......... 370/255, 370/256, 338
See application file for complete search history.

(56) References Cited

U.S. PATENT DOCUMENTS

| | | | |
|---|---|---|---|
| 6,307,843 B1 | 10/2001 | Okanoue | |
| 6,934,252 B2 * | 8/2005 | Mehrotra et al. | ............ 370/229 |
| 7,986,915 B1 * | 7/2011 | Wang et al. | ............ 455/7 |
| 2007/0274286 A1 | 11/2007 | Krishnan | |
| 2007/0298778 A1 * | 12/2007 | Chion et al. | ............ 455/422.1 |
| 2008/0107076 A1 * | 5/2008 | Ramachandran et al. | .... 370/331 |
| 2008/0123584 A1 * | 5/2008 | Behrendt et al. | ............ 370/315 |
| 2009/0028069 A1 * | 1/2009 | Lin et al. | ............ 370/256 |
| 2009/0190522 A1 | 7/2009 | Horn et al. | |

FOREIGN PATENT DOCUMENTS

| | | |
|---|---|---|
| KR | 20010042878 | 5/2001 |
| WO | WO0228034 A1 | 4/2002 |
| WO | WO03105502 A1 | 12/2003 |

OTHER PUBLICATIONS

IEEE802.16 Broadband Wireless Access Working Group, 'Proposal on addresses, identifiers and types of connections for 802.16j', Jan. 2007, pp. 1-9.*
International Search Report and Written Opinion—PCT/US2009/032471, International Search Authority—European Patent Office—May 18, 2009.
Taiwan Search Report—TW098103318—TIPO—Mar. 1, 2012.

* cited by examiner

Primary Examiner — Melvin Marcelo
(74) Attorney, Agent, or Firm — Michael DeHaemer

(57) ABSTRACT

A set of wireless relay nodes are managed to facilitate inter-node routing of packets in the set. In some aspects, unique identifiers are defined for the wireless relay nodes to facilitate routing packets within the set. In some aspect a routing table is provided to each of the wireless relay nodes, wherein the routing table identifies each wireless relay node in the set and a next-hop entity for each of these wireless relay nodes. Each of the wireless relay nodes may then define a forwarding table based on the routing table.

52 Claims, 10 Drawing Sheets

MANAGEMENT OF WIRELESS RELAY NODES USING IDENTIFIERS

CLAIM OF PRIORITY

This application claims the benefit of and priority to commonly owned U.S. Provisional Patent Application No. 61/024,764, filed Jan. 30, 2008, and the disclosure of which is hereby incorporated by reference herein.

CROSS-REFERENCE TO RELATED APPLICATION

This application is related to concurrently filed and commonly owned U.S. patent application Ser. No. 12/361,448, entitled "MANAGEMENT OF WIRELESS RELAY NODES USING ROUTING TABLE," and the disclosure of which is hereby incorporated by reference herein.

BACKGROUND

1. Field

This application relates generally to wireless communication and more specifically, but not exclusively, to managing wireless relay nodes.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations, additional base stations may be deployed to provide more robust wireless coverage to mobile units. For example, wireless relay stations and small-coverage base stations (e.g., commonly referred to as access point base stations, Home NodeBs, or femto cells) may be deployed for incremental capacity growth, richer user experience, and in-building coverage. As these other types of base stations may be added to the conventional mobile phone network (e.g., the backhaul) in a different manner than conventional base stations (e.g., macro base stations), there is a need for effective techniques for managing these other types of base stations.

SUMMARY

A summary of sample aspects of the disclosure follows. It should be understood that any reference to the term aspects herein may refer to one or more aspects of the disclosure.

The disclosure relates in some aspect to managing wireless relay nodes. For example, techniques are disclosed for configuring a set of wireless relay nodes in a manner that facilitates routing of packets within the set.

The disclosure relates in some aspect to providing a routing table for a set of wireless relay nodes. The routing table may identify, for example, each wireless relay node in the set and a next-hop entity for each of these wireless relay nodes. Each of the wireless relay nodes may then define a forwarding table based on routing table. The forwarding table, in turn, may be used by the wireless relay nodes to efficiently forward packets between the wireless relay nodes of the set.

The disclosure relates in some aspect to providing wireless relay node identifiers that are used to facilitate routing of packets within a set of wireless relay nodes. A different identifier may be defined for each wireless relay node of the set. In some aspects, these identifiers are used (e.g., by a relay management protocol) to describe the topology of the set of wireless relay nodes. In addition, packets routed within the set may include corresponding wireless relay node identifiers to identify a source node and/or a destination node for the packets within the set. Thus, when a wireless relay node of the set receives a packet, the wireless relay node may determine how to forward the packet based on the destination identifier in the packet and based on the forwarding table.

In some aspects, the wireless relay node identifiers are used to efficiently route compressed packets. For example, the header of a packet to be routed through the set of wireless relay nodes may be compressed to reduce the traffic overhead. Since the conventional source and destination addresses of the packet also may be compressed in this case, the wireless relay node identifier may be appended to the packet to provide source and destination information for routing the packet within the set. Advantageously, a wireless relay node identifier may be relatively small (e.g., as compared to conventional source and destination addresses). Thus, the use of such an identifier may not significantly increase the routing overhead in the system.

The wireless relay node identifiers may take different forms in different implementations. In some implementations more globally unique (e.g., as opposed to set-unique) identifiers may be employed to identify the nodes of a cluster. For example, Internet Protocol ("IP") addresses assigned to the relays may be used to route packets within set of wireless relay nodes (i.e., the wireless relay node identifiers may comprise IP addresses). Alternatively, in some implementations the wireless relay node identifiers are MAC addresses of the wireless relay nodes. In some implementations Layer 2 or Layer 3 forwarding may be employed where all of the wireless relay nodes in a set are part of the same subnet. In some implementations Layer 3 routing may be employed where cascading subnets are defined for each wireless relay node in a set.

BRIEF DESCRIPTION OF THE DRAWINGS

These and other sample aspects of the disclosure will be described in the detailed description and the appended claims that follow, and in the accompanying drawings, wherein:

Figure 1:
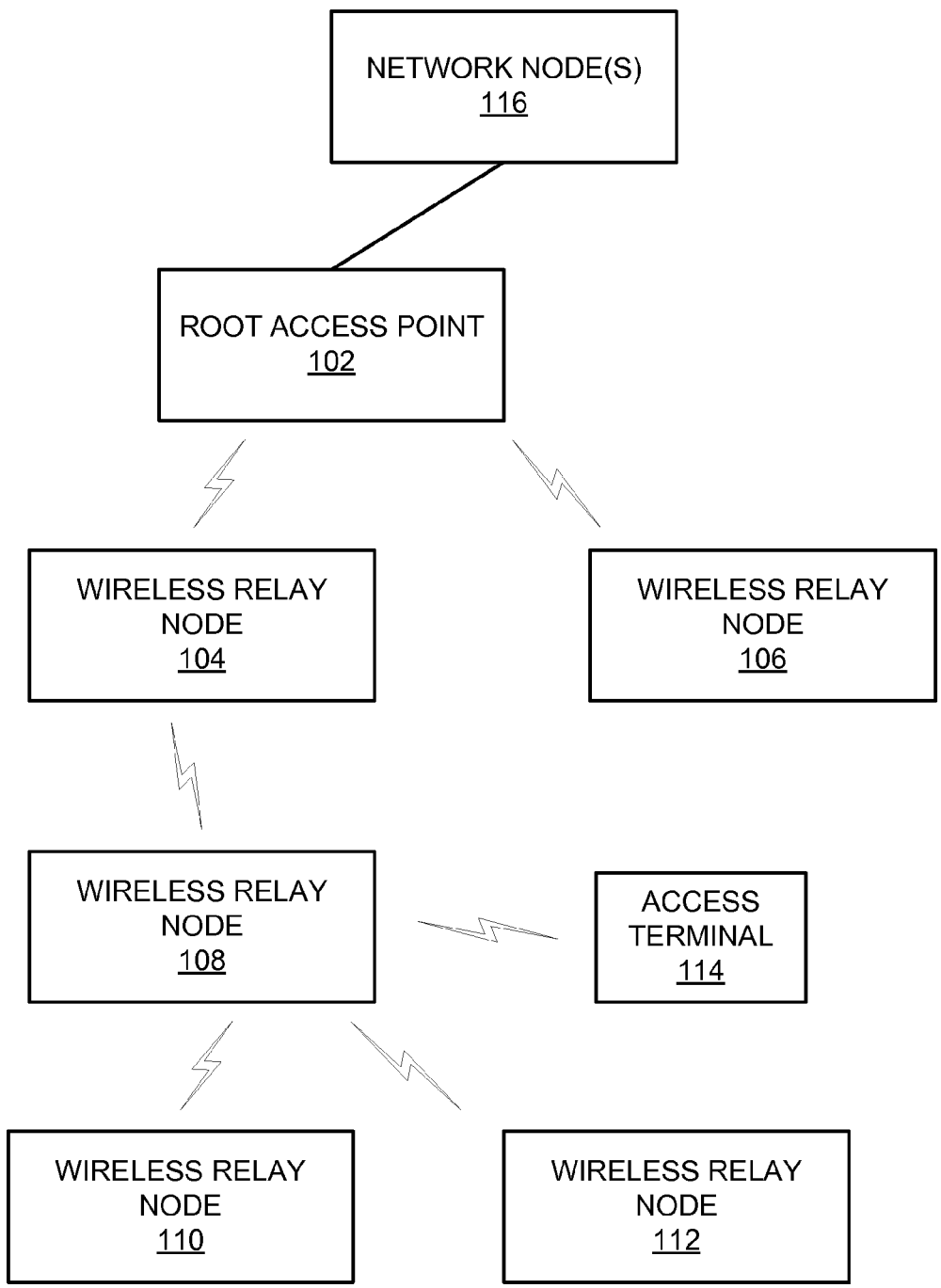
FIG. 1 is a simplified block diagram of several sample aspects of a communication system including a set of wireless relay nodes.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100 (e.g., a portion of a communication network). For illustration purposes, various aspects of the disclosure will be described in the context of one or more wireless relay nodes, access points, access terminals, and network nodes that communicate with one another. It should be appreciated, however, that the teachings herein may be applicable to other types of apparatuses or other similar apparatuses that are referenced using other terminology. For example, an access point may be implemented or referred to as a base station or eNodeB, while an access terminal may be implemented or referred to as user equipment or a mobile unit.

Access points (e.g., root access point 102) and wireless relay nodes (e.g., wireless relay nodes 104, 106, 108, 110, and 112) in the system 100 provide one or more services (e.g., network connectivity) for one or more wireless terminals (e.g., access terminal 114) that may reside within or that may roam throughout an associated geographical area. In the example of FIG. 1, the access point 102 communicates with one or more network nodes (represented, for convenience, by network node 116) to facilitate wide area network connectivity. Such network nodes may take various forms such as, for example, one or more radio and/or core network entities (e.g., access gateways, mobility management entities, session reference network controllers, or some other suitable network entity or entities).

FIG. 1 and the discussion that follows describe various schemes for managing a set of wireless relay nodes to facilitate routing information (e.g., packets) through the set. In particular, the teachings herein may be employed to effectively route packets over multiple relay hops. In some aspects, the term root access point as used herein refers to an access point that uses one technology to provide wireless access (e.g., for access terminals and/or wireless relay nodes) and uses a different wired technology or wireless technology to provide backhaul connectivity. In some aspects, the term wireless relay node as used herein refers to an access point that uses the same wireless technology to provide access (e.g., for access terminals) and to provide backhaul connectivity (e.g., to send information to and receive information from a core network via a root access network or another wireless relay node). Thus, from the perspective of an access terminal, a wireless relay node may operate in some aspects like an access point. Conversely, from the perspective of the root access point, a wireless relay node may operate in some aspects like an access terminal. For convenience, a wireless relay node may be referred to simply as a relay in the description that follows. In some aspects, the term relay cluster (which may simply be referred to as a cluster herein) refers to a root access point and a set of wireless relay nodes that may communicate to the core network via that root access network. Here, a root access point is associated with a single cluster, while a relay may be associated with one or more clusters.

Sample operations of the system 100 will now be described in conjunction with the flowchart of FIG. 2. Blocks 202-210 describe several operations that may be performed to manage a set of relays in a cluster. These operations involve, in some aspects, managing (e.g., creating and deleting) unique cluster-specific identifiers for each relay in the cluster, maintaining a mapping between these identifiers and other identifiers (e.g., network-based identifiers) assigned to the relays, and maintaining a routing table that is indicative of the topology of the cluster that the relays in the cluster may use to form a forwarding table. Blocks 212 and 214 describe several operations that may be performed to route packets within the cluster (e.g., forward packets to the appropriate link) using the above information. For example, through the use of the maintained topology-related information, routing may be supported to or from an access terminal whose serving access network is a relay in the cluster, and routing may be support to or from a relay whose serving access network is a relay in the cluster. In some aspects, the operations of FIG. 2 may be performed by a relay management protocol implemented at the nodes of the cluster.

As represented by block 202, a unique identifier may be defined for each relay in a cluster and these identifiers may be sent to all of the relays in the cluster. As will be discussed in more detail below, the relays in the cluster may use these identifiers to route packets within the cluster.

In some implementations the identifiers are only used in cases where compressed packets are routed within a cluster. In such cases, the source and destination information in the packet header may be compressed. Thus, the identifiers may be appended to the packets to facilitate routing the packets within the cluster. Advantageously, the identifiers may be relatively small (e.g., 10 bits or less) since they only need to be unique within the cluster. Thus, the packets may be efficiently routed within the cluster since the addition of the identifiers may not cause significant overhead.

An identifier may be defined for a given relay whenever that relay joins the cluster. For example, in FIG. 1 an identifier may be defined when the relay 106 first connects to the root access point 102 or when the relay 108 first connects to the relay 104. In a typical implementation, the identifier for a new relay is defined by the root access point of the cluster. However, in other implementations a relay (e.g., the relay with which the new relay connects) may define the identifier for the new relay.

In some aspects, the cluster-specific identifier for each relay is associated with another identifier that is assigned to that relay. In some aspects, this other identifier may be used to uniquely identify a given relay over a broader identifier space than the cluster. For example, this other identifier may uniquely identify a relay within a network (e.g., a private network, an operator network, or a global network). In some implementations this other identifier comprises an IP address or is based on an IP address assigned to the relay. For convenience, this other identifier may be referred to herein as a network identifier.

In some aspects, the relays of a cluster may use the network identifiers to forward packets to other nodes in the cluster. In the discussion that follows it may be assumed that the relays 104, 106, 108, 110, and 112 are assigned network identifiers RS1, RS2, RS3, RS4, and RS5, respectively.

In some implementations, the cluster-specific identifiers defined for the relays in a cluster are provided to all of the relays of the cluster in the form of a list that maps the cluster-specific identifier for each relay to its associated network identifier. For example, when a relay joins a cluster, the relay may send its network identifier to the root access point. The root access point may then update the list with the new cluster-specific identifier and the associated network identifier for that relay and send the list to all of the relays in the cluster.

Referring again to FIG. 2, as represented by block 204, a routing table is maintained for the cluster and this routing table information may be sent to all of the relays in the cluster whenever there is a change in the cluster. For example, the root access point of the cluster may define a new routing table whenever a relay joins, moves within, or leaves the cluster.

In some aspects the routing table describes the topology of the cluster. For example, a routing table may describe the tree connectivity for all relays in a cluster.

Table 1 illustrates an example of a routing table that identifies the serving node for each relay (i.e., as identified by the cluster-specific relay identifiers described above) in the cluster. Using FIG. 1 as an example, the relays 104, 106, 108, 110, and 112 are assigned relay IDs 1, 2, 3, 4, and 5, respectively. The root access point 102 is assigned identifier 0. Thus, since the root access point 102 is the serving node for relays 104 and 106, the serving node ID entry in the routing table for each of identifiers 1 and 2 is serving node ID 0. Similarly, since the relay 108 is the serving node for relays 110 and 112, the serving node ID entry in the routing table for each of relay IDs 4 and 5 is serving node ID 3.

TABLE 1

| RELAY ID | SERVING NODE ID |
| --- | --- |
| 1 | 0 |
| 2 | 0 |
| 3 | 1 |
| 4 | 3 |
| 5 | 3 |

Figure 2:
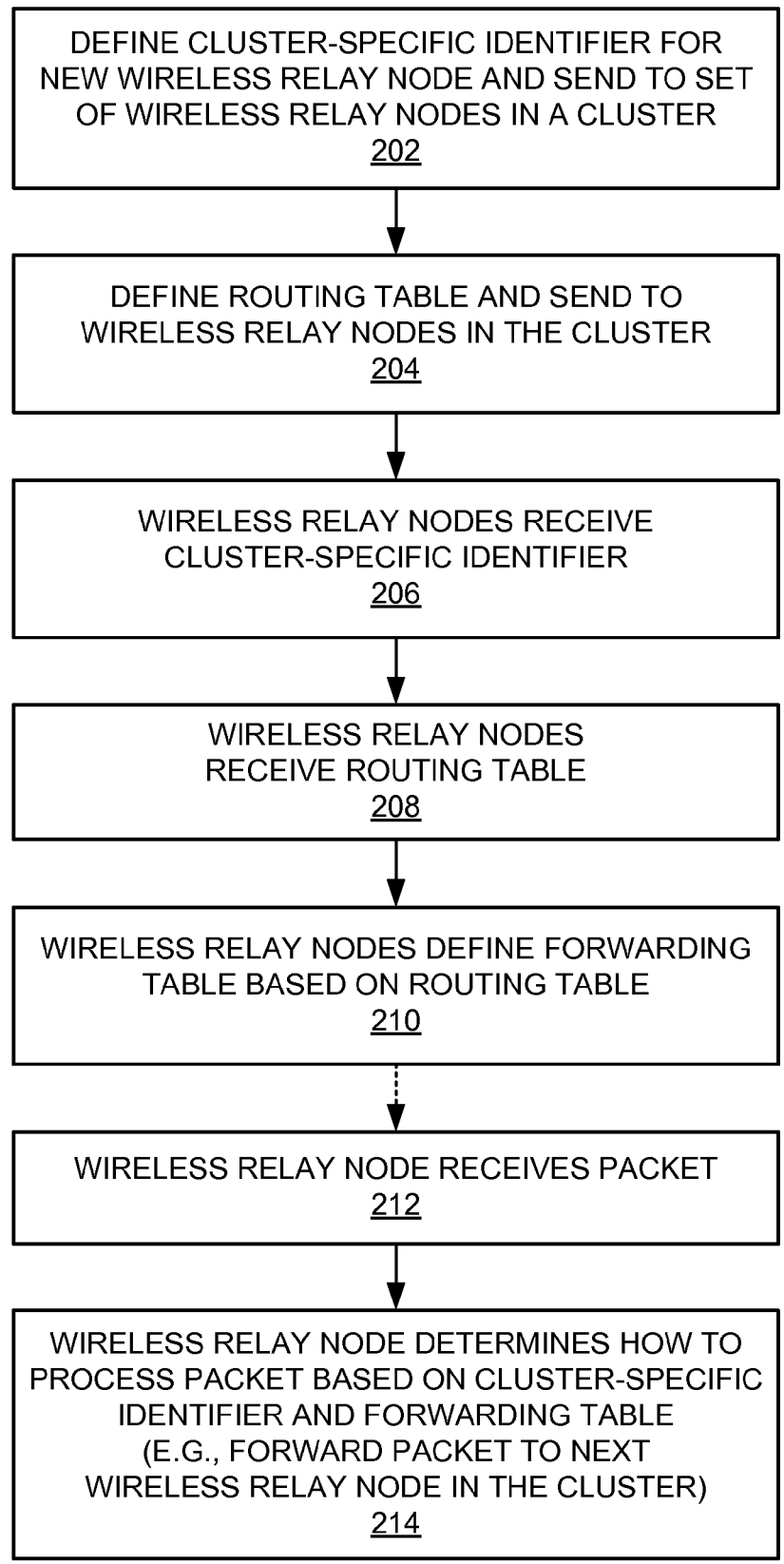
FIG. 2 is a flowchart of several sample aspects of operations that may be performed to manage a set of wireless relay nodes and route packets through the set of wireless relay nodes.

As represented by block 206 in FIG. 2, each of the relays in the cluster receives the cluster-specific identifiers sent out at block 202. As mentioned above, these identifiers may be sent out in the form of a list that also includes other identifiers that are associated with the relays. In this way, each relay in the cluster may maintain a table that lists the identifiers associated with each relay that is currently in the cluster.

As represented by block 208, each of the relays in the cluster also receives the routing table information sent out at block 204. Thus, each relay in the cluster may maintain a table that described the current topology of the cluster.

As represented by block 210, each of the relays in the cluster may define a forwarding table based on the information from the routing table. In some aspects, the forwarding table for a given relay may include an entry for each relay that is downstream of that relay. As shown in Tables 2 and 3, each entry in the forwarding table may include, for example, the identifier of the downstream relay (RELAY ID) and the identifier of the next link (NEXT LINK ID) from the current relay in the direction of the downstream relay. Referring again to the example of FIG. 1, Table 2 illustrates a forwarding table for the relay 104. In this case there are three downstream relays: relays 108, 110, and 112 that are assigned RELAY IDs 3, 4, and 5, respectively. Due to the topology of FIG. 1 (as indicated by the routing table of Table 1), the next link downstream from relay 104 for each of these relays is relay 108. Thus, the global identifier assigned to relay 108 (RS3) is used as the NEXT LINK ID for each of these RELAY IDs. Similarly, Table 3 illustrates a forwarding table for the relay 108. In this case there are two downstream relays: relays 110 and 112 that are assigned RELAY IDs 4 and 5, respectively. Due to the topology of FIG. 1 (as indicated by the routing table of Table 1), the next link downstream from relay 108 for relay 110 is relay 110 and the next link downstream from relay 108 for relay 112 is relay 112. Thus, the global identifier assigned to relay 110 (RS4) is used as the NEXT LINK ID for RELAY ID 4 and the global identifier assigned to relay 112 (RS5) is used as the NEXT LINK ID for RELAY ID 5.

TABLE 2

| RELAY ID | NEXT LINK ID |
| --- | --- |
| 3 | RS3 |
| 4 | RS3 |
| 5 | RS3 |
| Other | Default (uplink) |

TABLE 3

| RELAY ID | NEXT LINK ID |
| --- | --- |
| 4 | RS4 |
| 5 | RS5 |
| Other | Default (uplink) |

Tables 2 and 3 also illustrate that the forwarding table may define a default link to account for a case where a relay receives a packet that is destined for a relay that is not downstream. For example, if relay 104 receives a packet that has a destination of RELAY ID 2, the relay 104 may send the packet uplink (i.e., to the root access point 102). Similarly, if relay 108 receives a packet that has a destination of RELAY ID 1 or 2, the relay 108 may send the packet uplink (i.e., to the relay 104).

Once the forwarding tables are established at each relay in the cluster, the relays may use the forwarding table to route packets within the cluster. For example, as described in more detail below, when a packet is to be sent through the cluster, a node of the cluster (e.g., the root access point or a relay) may append a header that includes the cluster-specific identifiers associated with the source and destination for the packet, if applicable.

Thus, as represented by block 212, at some point in time a relay may receive a packet that is to be routed within the cluster. The relay may then determine whether the packet includes a cluster-specific identifier.

If so, as represented by 214, the relay determines how to process the packet based on the cluster-specific identifier in the packet and the forwarding table. For example, the relay may elect to process the packet if this relay is the intended destination as indicated by the cluster-specific identifier in the packet. Conversely, the relay may elect to forward the packet if this relay is not the intended destination. In this case, the relay may use the forwarding table to determine the node in the cluster to which the packet is to be sent.

With the above in mind, additional details relating to managing a cluster and routing packets within the cluster will be described in the context of the flowcharts of FIGS. 4A-5B. Specifically, FIGS. 4A and 4B describe sample operations than may be employed to manage identifiers and associated lists or tables in a cluster. In this example it will be assumed that the root access point for the cluster defines the identifiers and routing table used by the relays of the cluster. FIGS. 5A and 5B describe sample operations that may be employed to route packets within the cluster using the managed information.

For purpose of illustration, the operations of FIGS. 4A-5B will be described, in part, in the context of a network where nodes of the network may communicate with one another by establishing routes between the nodes. An example of such a network is an Ultra-Mobile Broadband network. Here, the network identifier referred to above may comprise an access node identifier ("ANID"). In addition, the cluster-specific identifier may comprise a compressed ANID (e.g., only comprising a few bits). An ANID may be used in multi-hop to identify a relay in the cluster. For example, the ANID for a relay may be determined based on the IP address assigned to the relay. As the IP address is part of the relay's session, the IP address does not need to be exchanged each time the relay opens a route.

Figure 3:
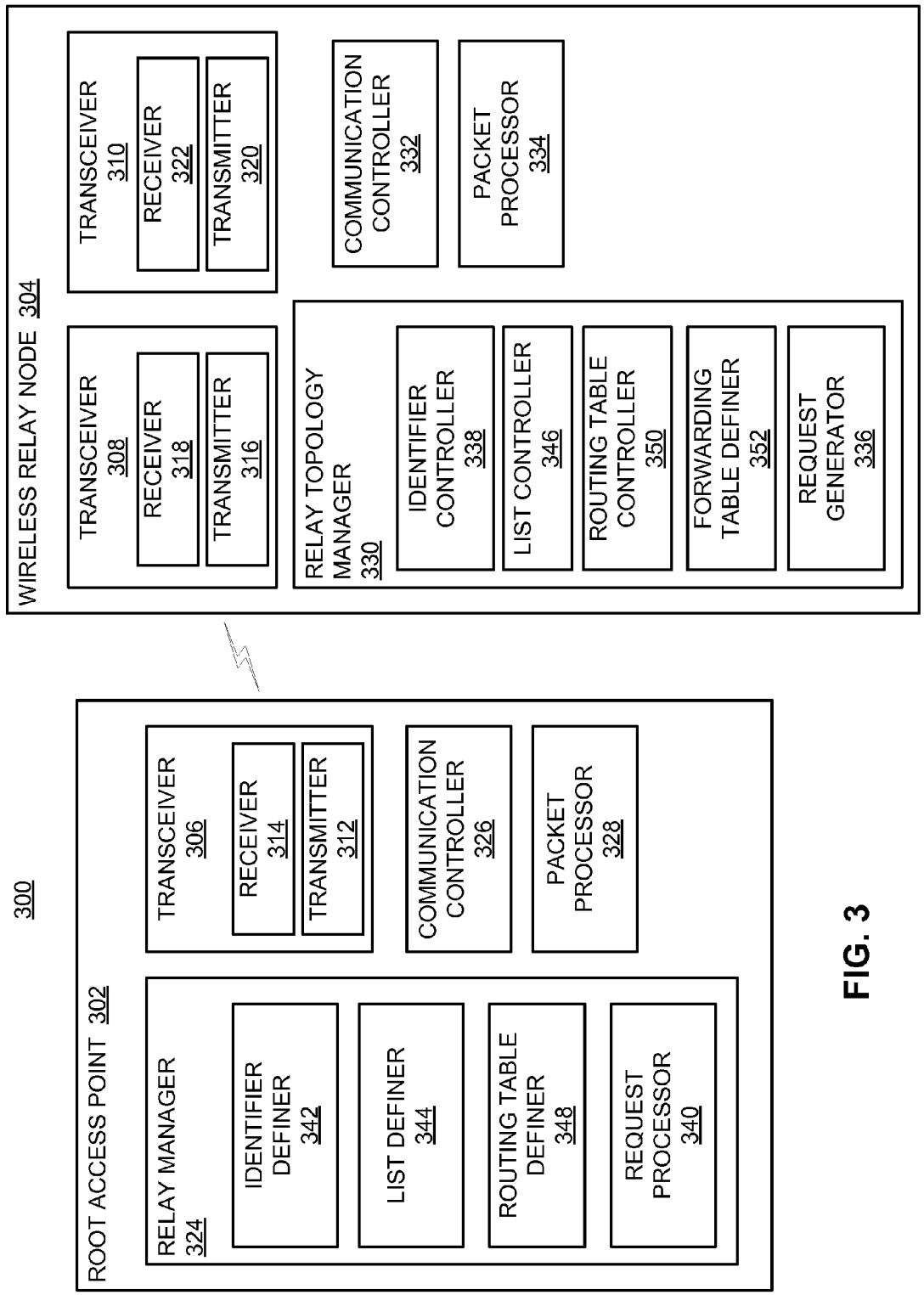
FIG. 3 is a simplified block diagram of several sample components of communication nodes.

For convenience, the operations of FIGS. 4A-5B (or any other operations discussed or taught herein) may be described as being performed by specific components (e.g., components of a system 300 as shown in FIG. 3). It should be appreciated, however, that these operations may be performed by other types of components and may be performed using a different number of components. It also should be appreciated that one or more of the operations described herein may not be employed in a given implementation.

FIG. 3 illustrates sample components that may be employed in a node 302 that manages a cluster (e.g., a root access point) and a node 304 that provides access (e.g., a relay). To reduce the complexity of FIG. 3, only two nodes are shown in the system 300. In practice, however, a system such as the system 300 (e.g., corresponding to the system 100) may have many nodes operating as managing nodes and many nodes operating as access nodes at a given time.

The nodes 302 and 304 include respective transceivers 306 and 308 for communicating with each other and other nodes in the system 300. In some implementations the node 304 includes another transceiver 310 for communicating with other nodes (e.g., access terminals) in the system 300. Here, the transceivers 308 and 310 may embody the same type of wireless technology (e.g., an LTE air interface). In other implementations, however, the node 304 may include a single transceiver (e.g., transceiver 308) that is configured to support both access wireless communication and backhaul wireless communication. In some cases, the node 304 may communicate with one node (e.g., an access point) on some interlaces and communicate with another node (e.g., an access terminal) on other interlaces. The transceiver 306 includes a transmitter 312 for sending signals (e.g., packets for relay management and other traffic) and a receiver 314 for receiving signals. The transceiver 308 also includes a transmitter 316 for sending signals and a receiver 318 for receiving signals. Similarly, the transceiver 310 includes a transmitter 320 for sending signals and a receiver 322 for receiving signals.

For purposes of illustration, several components that may be employed in conjunction with managing a cluster and sending/receiving traffic are shown in the node 302. It should be appreciated that some or all of this functionality may be implemented in other nodes (e.g., in some implementations a relay may provide cluster management functionality). As shown, the node 302 may include a relay manager 324 that provides functionality relating to managing relays in an associated cluster. Other aspects of the relay manager 324 are described in more detail below. The node 302 also may include a communication controller 326 for processing traffic (e.g., controlling the transmission and receipt of packets) and providing other communication-related operations. Furthermore, the node 302 may include a packet processor 328 for processing packets (e.g., providing packets to be transmitted and processing received packets) and providing other related operations.

For purposes of illustration, several components that may be employed in conjunction with sending/receiving traffic at a wireless relay node are shown in the node 304. It should be appreciated that similar functionality may be implemented in other wireless relay nodes in the system 300. The node 304 includes a relay topology manager 330 that provides functionality relating to maintaining information (e.g., topology information) for an associated cluster. Other aspects of the relay topology manager 330 are described in more detail below. The node 304 also may include a communication controller 332 for processing traffic (e.g., controlling the transmission and receipt of packets) and providing other communication-related operations. Furthermore, the node 304 may include a packet processor 334 for processing packets (e.g., providing packets to be transmitted and processing received packets) and providing other related operations.

Figure 4A:
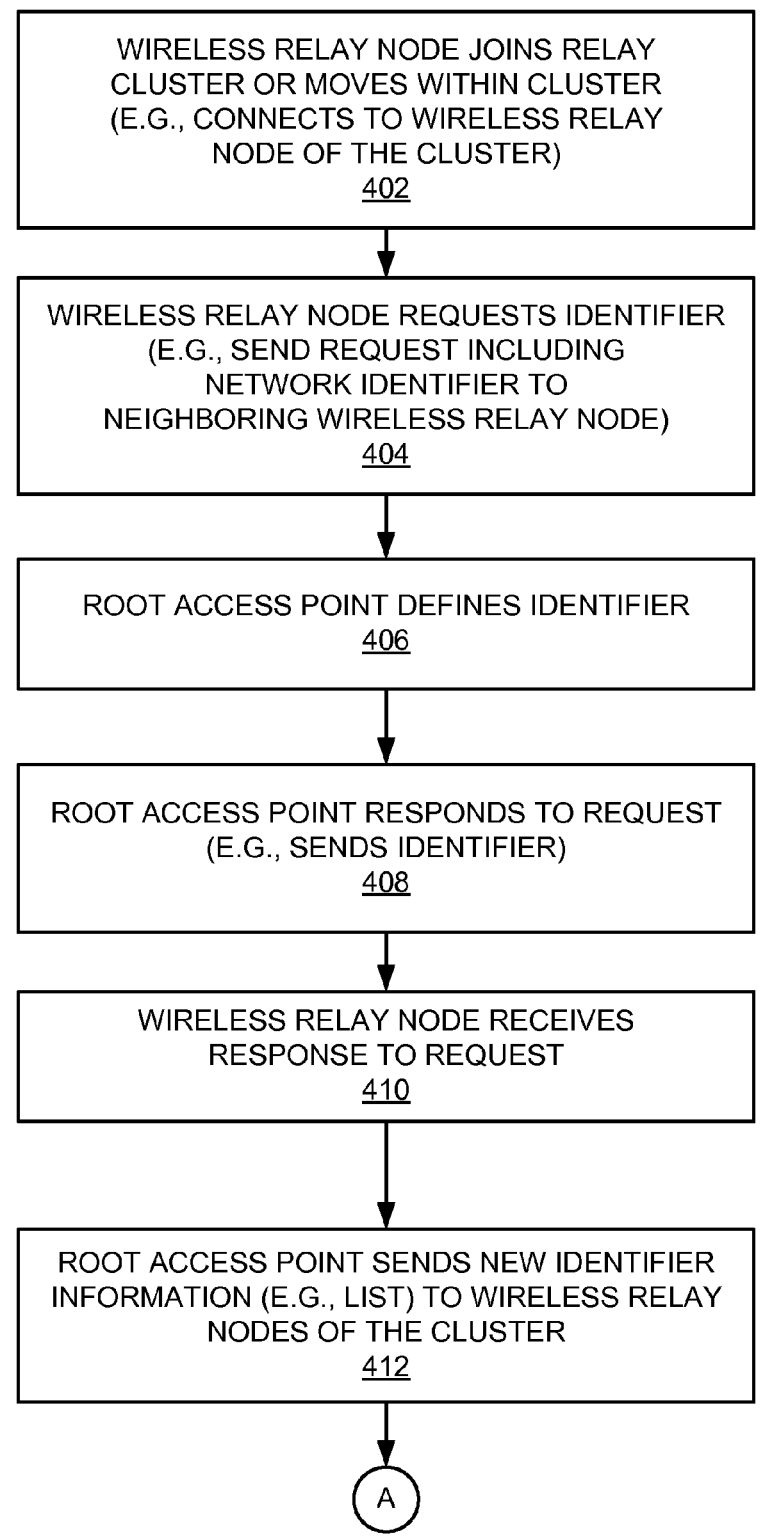
FIGS. 4A and 4B are a flowchart of several sample aspects of operations that may be performed to manage a set of wireless relay nodes.
Figure 5A:
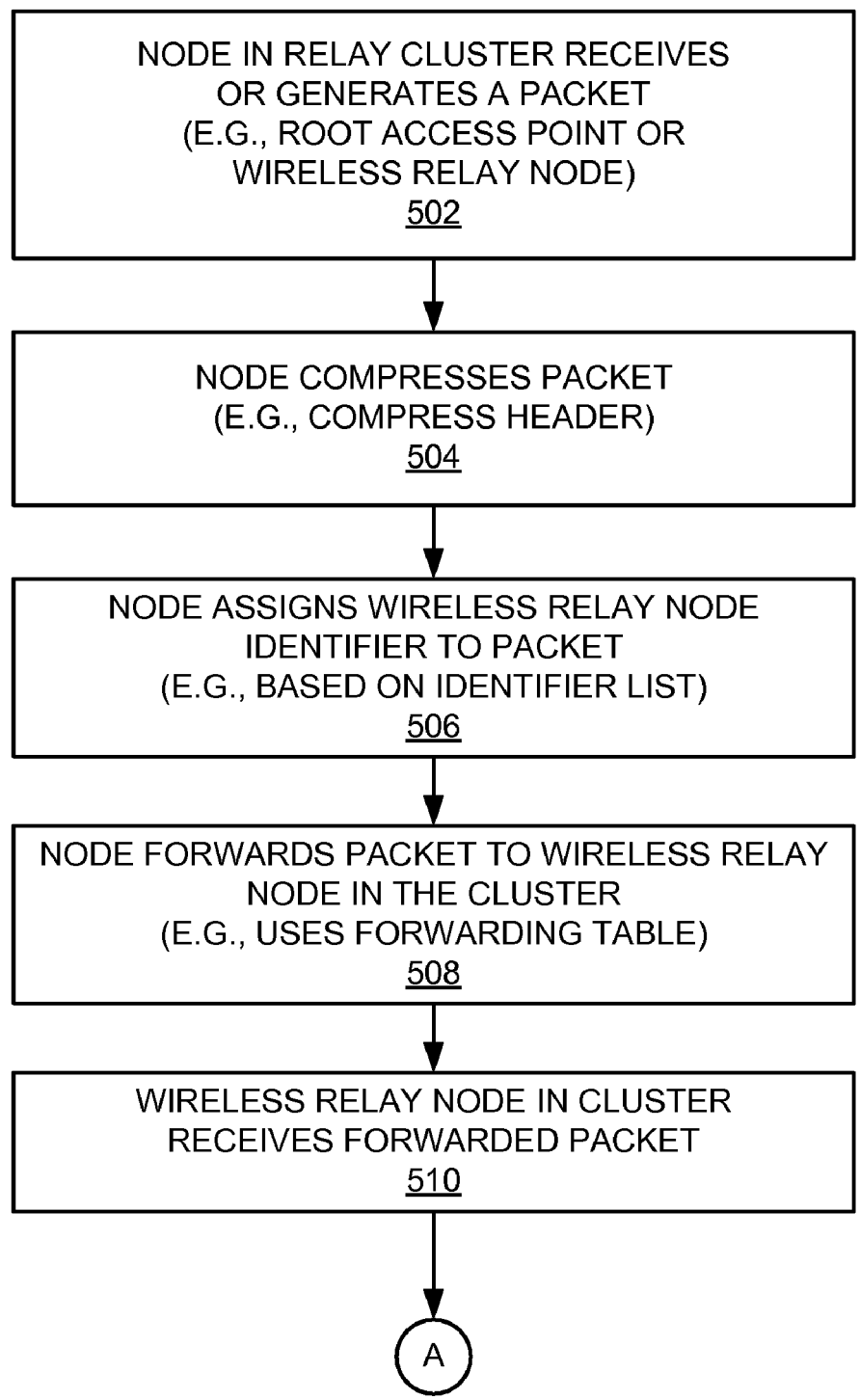
FIGS. 5A and 5B are a flowchart of several sample aspects of operations that may be performed to route packets within a set of wireless relay nodes.
Figure 5B:
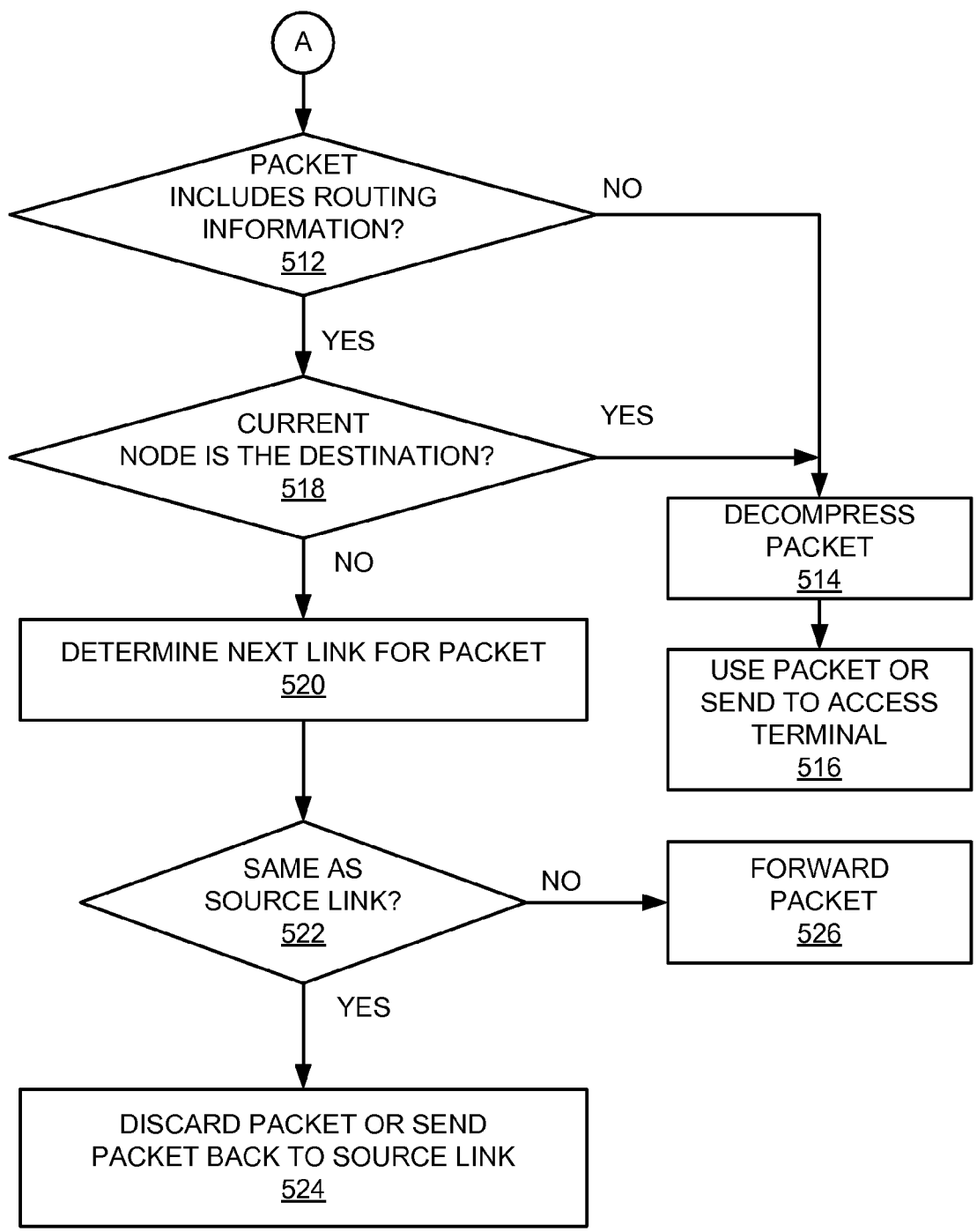

Referring now to FIG. 4A, as represented by block 402, at some point in time a relay joins a cluster or moves within the cluster. As an example of the former scenario, the relay 110 of FIG. 1 which is installed in the coverage area of relay 108 may have recently powered-on and connected to the relay 108. As an example of the latter scenario, the relay 112 may be a mobile node that was connected to the relay 106, but has moved into the coverage area of relay 108 and is now connected to the relay 108.

As represented by block 404, in conjunction with joining or moving within a cluster, a relay may request a cluster-specific identifier. For example, the relay may transmit a message that requests that an identifier be defined for that relay. Here, the request message may include the network identifier of the relay. Consequently, the node that defines the identifier may update its list of the relay identifiers for the cluster with this information. In the example of FIG. 3, a request generator 336 may generate the request and cooperate with the transmitter 316 to transmit the request.

In some implementations (e.g., an LTE-based implementation), the relay may send the request to a node to which the relay is connected. For example, the relay 110 of FIG. 1 may send the request to the relay 108. In this case, the relay 108 (e.g., an identifier controller 338 in the relay) may determine that it cannot process this request (e.g., based on a message identifier in the request). The relay 108 may then forward the message to a node to which it is connected (e.g., the relay 104). This process may continue until the request reaches a node that will process the request (e.g., the root access point 102). In the example of FIG. 3, a request processor 340 may cooperate with the receiver 314 to receive the request, after which the request processor 340 processes the request.

In some implementations (e.g., a UMB-based implementation), the relay may establish a route to the node that will process the request, and then send the request to that node via the route. In this case, upon receiving a RouteOpen indication, the relay may perform the operations that follow. The relay sends a RootRequest message on the route. If the relay does not have a route to the ANID in the RootResponse, the relay may open a route to the root access point, and move its data attachment point (if needed) to the root access point for the forward link serving eNodeB ("FLSE"). The relay may send an IDRequest to the root access point after receiving a RouteOpenAccept from the root access point.

As represented by block 406, the root access point defines a cluster-specific identifier for the relay (e.g., upon receipt of the request from the relay). As mentioned above, since the request may include a network identifier of the relay, the root access point may associate the newly defined identifier with that network identifier. In the example of FIG. 3, these operations may be performed by an identifier definer 342.

The root access point may respond to the request by sending the newly defined identifier to the relay at block 408. In the example of FIG. 3, the identifier definer 342 may cooperate with the communication controller 326 and the transmitter 312 to transmit the response.

The relay may then receive the response to the request at block 410. In the example of FIG. 3, the identifier controller 338 may cooperate with the receiver 314 to receive the response, and the identifier controller 338 processes the response to obtain the identifier.

In some implementations (e.g., a UMB-based implementation), the root access point assigns the cluster-specific identifier after receiving a RouteOpen indication for a relay (e.g., upon receiving an IDRequest from the relay as discussed above). The root access point then sends an IDAssign message to the relay that includes the assigned cluster-specific identifier for that relay. When the relay receives the identifier assignment via the IDAssign message, the relay may set its CurrentID to the identifier in the IDAssign message and send an IDAssignAck acknowledgment message to the root access point.

As mentioned above, the root access point may maintain an identifier table (e.g., list) that includes the cluster-specific identifier and the network identifier for each relay in the cluster. Referring to the example described above in conjunction with FIG. 2, the table may include a mapping of identifiers 1, 2, 3, 4, and 5 to network identifiers (e.g., ANIDs) RS1, RS2, RS3, RS4, and RS5, respectively. In FIG. 3, these operations may be performed by a list definer 344.

As represented by block 412, the root access point may send this new identifier information to all of the relays of the cluster. In this way, all of the relays of the cluster may be informed of the cluster-specific identifier and the network identifier of the new relay in the cluster. In some implementations the root access point may send the entire identifier table (e.g., list) to the relays of the cluster each time the identifier table is changed. Alternatively, in some implementations the root access point may simply indicate any changes to the identifier table. For example, the root access point may send a message that contains the identity of any new identifiers that have been added to the table or any identifiers that have been deleted from the table since the last identifier table information was sent out. Here, the root access point may employ a synchronization scheme (e.g., by including a sequence number with the message) to ensure that the relays are able to determine whether they have an up-to-date identifier table. In the example of FIG. 3, the list definer 344 may cooperate with the communication controller 326 and the transmitter 312 to transmit the above information.

In some implementations (e.g., a UMB-based implementation), the root access point may send (depending on policy) an IDTable message including the identifier table information to all relays in the cluster when a relay opening a new route in the cluster is assigned a cluster-specific identifier or when a relay closes a route in the cluster. In some cases, a relay may send an IDTableRequest after receiving an IDAssign message. In this case, the root access point may send the IDTable message in response to the request from the relay.

Figure 4B:
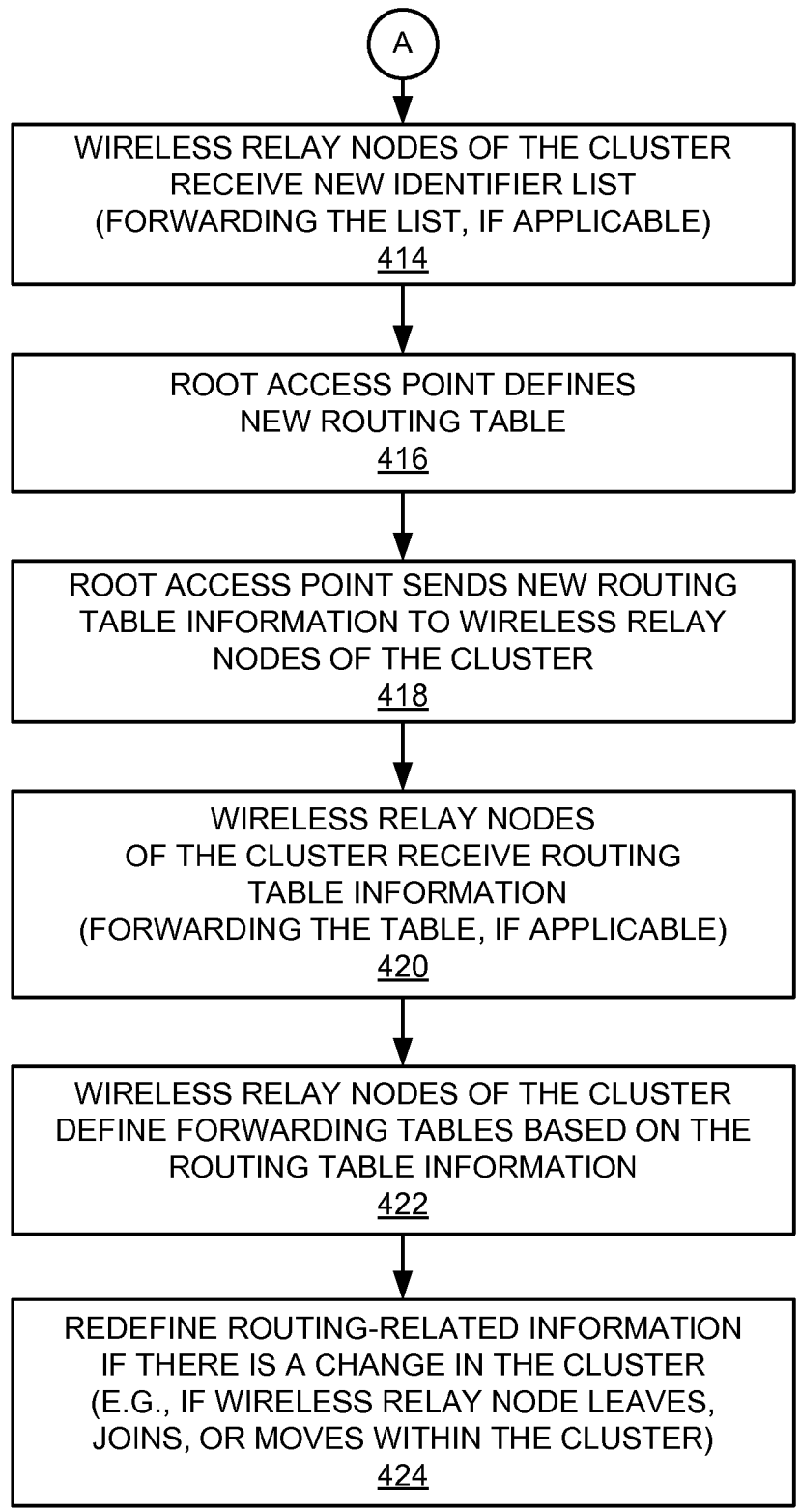

Referring now to FIG. 4B, the relays receive the identifier list information as represented by block 414. In the example of FIG. 3, a list controller 346 may cooperate with the receiver 318 to receive the list information, whereupon the list controller 346 processes the information.

In some cases (e.g., an LTE-based implementation), each relay that receives the list may forward the list to another relay. For example, upon receiving an identifier list, the relay 104 (e.g., a list controller 346 of the relay) may forward the list to the relay 108. The relay 108, in turn, may forward the list to the relays 110 and 112.

In some cases (e.g., a UMB-based implementation), upon receiving an IDTable message, a relay may perform the operations that follow. First, the relay may validate the message. Here, the relay may discard the message if the message is invalid. Next, the relay may determine whether a MessageSequence field of the message includes the next expected message sequence for an IDTable message. If not, the relay may discard the message and send an IDTableRequest message with the MessageSequence field set to the last MessageSequence received for an IDTable message that was processed successfully.

Otherwise, the relay may update its ID-to-ANID table based on the contents of the IDTable message. Here, the relay may add all relays listed in the IDTable message for which an IsNewEntry field indicates that this is a new entry (e.g., the field is set to a "1"). The relay may delete all relay stations listed in the IDTable for which the IsNewEntry field indicates that this entry is to be deleted (e.g., the field is set to a "0"). The relay may then send an IDTableAck acknowledgment message to the root access point.

As represented by block 416, the root access point also may define a new routing table in response to the change in the topology of the cluster (e.g., a new relay joining the cluster). In the example of FIG. 3, the routing table may be maintained by a routing table definer 348.

As represented by block 418, the root access point sends new routing table information to all of the relays of the cluster. In this way, all of the relays of the cluster may be informed of the new topology of the cluster. In some implementations the root access point may send the entire routing table to the relays of the cluster each time the routing table is changed. Alternatively, in some implementations the root access point may simply indicate any changes to the routing table. For example, the root access point may send a message that contains the routing table entries of any new identifiers that have been added or an indication of any routing table entries that have been deleted since the last routing table information was sent out. Again, the root access point may employ a synchronization scheme (e.g., by including a sequence number with the message) to ensure that the relays are able to determine whether they have an up-to-date routing table. In the example of FIG. 3, the routing table definer 348 may cooperate with the communication controller 326 and the transmitter 312 to transmit the above information.

In some cases (e.g., a UMB-based implementation), the root access point sends a ClusterTopology message that includes the routing table information to all of the relays in an associated serving cluster. The root access point may send this message when a relay or the root access point becomes the FLSE for a relay, or is no longer the FLSE for a relay. That is, the message may be sent when the forwarding tables in the cluster change.

A serving cluster may be defined as a cluster for which there is a path from the root access point to the relay for which the serving access point of each relay on the path is a member of the cluster. Each relay station in the serving cluster may have exactly one entry in the ClusterTopology table even if it has open routes to multiple members of the cluster. A relay that has an entry in the IDTable but not in the ClusterTopology table is not in the serving cluster.

In some cases, a relay may send a request for routing table information. For example, if the root access point is in the serving cluster, the relay may send a ClusterTopologyRequest after receiving an IDAssign message. In the example of FIG. 3, the request generator 336 may cooperate with the transmitter 316 to transmit such a request.

The relays of the cluster receive the routing table information as represented by block 420. In the example of FIG. 3, a routing table controller 350 may cooperate with the receiver 318 to receive the routing table information, whereupon the routing table controller 350 processes the information.

In some cases (e.g., an LTE-based implementation), each relay that receives the routing table information may forward the information to another relay. For example, upon receiving a new routing table, the relay 104 (e.g., a routing table controller 350 of the relay) may forward the routing table to the relay 108. The relay 108, in turn, may forward the routing table to the relays 110 and 112.

In some cases (e.g., a UMB-based implementation), upon receiving a ClusterTopology message, a relay may perform the operations that follow. First, the relay may validate the message. Here, the relay may discard the message if the message is invalid. Next, the relay may determine whether a MessageSequence field of the message includes the next expected message sequence for a ClusterTopology message. If not, the relay may discard the message and send a ClusterTopologyRequest message with the MessageSequence field set to the last MessageSequence received for a ClusterTopology message that was processed successfully.

Otherwise, the relay may update its forwarding table (discussed below) based on the contents of the ClusterTopology message. Here, the relay may add all relays listed in the ClusterTopology message for which an IsNewEntry field indicates that this is a new entry (e.g., the field is set to a "1"). The relay may delete all relays listed in the ClusterTopology for which the IsNewEntry field indicates that this entry is to be deleted (e.g., the field is set to a "0"). The relay may also delete from the cluster all relays below a deleted relay. The relay may then send a ClusterTopologyAck acknowledgment message to the root access point.

As represented by block 422, each relay of the cluster defines a forwarding table based on the received routing table information. The forwarding table may take the form of Table 2 or 3 discussed above, or some other suitable form. In the example of FIG. 3, the forwarding table may be defined by a forwarding table definer 352.

As represented by block 424, the nodes of the cluster may perform operations similar to those described above to maintain (e.g., update) the identifiers and tables whenever there is a change in the topology of the cluster. For example, the identifier table, the routing table, and the forwarding tables may be modified whenever a relay leaves the cluster, joins the cluster, or moves within the cluster.

In some implementations, a root access point may automatically discover a change in the cluster topology since the root access point contains a route to every relay in the cluster (e.g., as opposed to systems where a change in topology is discovered locally and has to percolate up to the root). In either case, the root access point may intelligently send updates to the topology based on knowledge of a change in topology. For example, the root access point may only send an update to an affected portion of the topology (e.g., a portion of the relays in the cluster) and not inform the rest of the topology. The root access point may elect to not send out topology information for a mesh that is only two hops (one for access and one for backhaul) or to a relay that does not forward packets downstream. Nevertheless, the root access point may still send the identifier table to enable compression (discussed below).

As an example of the above, when a root access point receives a RouteClosed indication (indicating that a route to a relay has been closed), the root access point may send an updated ClusterTopology message to all of the remaining relays in the cluster. In addition, upon receiving a RouteClosed indication, a relay may delete the identifier and forwarding tables for the cluster.

When a relay leaves the cluster, the cluster specific identifier for the relay may not be reused for a defined period of time. For example, an identifier may not be reused for a period of time after a route is closed to a relay, so that all packets in the cluster for that relay may be "flushed" from the cluster.

Referring now to FIGS. 5A and 5B, sample operations that may be performed by the nodes of a cluster to route packets within the cluster will be described. In this example, it is assumed that a packet being passed through the cluster is compressed upon entering the cluster or when it is generated by a node of the cluster. It should be appreciated, however, that the teachings herein may be applicable to implementations where packets are routed through a cluster without being compressed.

As represented by block 502 of FIG. 5A, at some point in time a node in the cluster receives or generates a packet that is to be routed within the cluster. As one example, a relay may generate a control packet that is to be sent to the core network (e.g., via an access gateway as represented by network node 116 in FIG. 1). As another example, a relay (e.g., relay 108) may receive a packet from an associated access terminal (e.g., access terminal 114) that is to be sent to another device via the core network. As yet another example, the root access point 102 may receive a packet from the core network that is destined for a relay (e.g., in the case of a control packet) or an access terminal that is connected to a relay (e.g., in the case of a data packet). In the example of FIG. 3, a packet processor 328 or 334 may generate this packet or cooperate with an associated receiver 314 or 318 to receive the packet.

As represented by block 504, the node compresses the packet prior to routing the packet through the cluster. For example, the nodes of the cluster may implement a compression protocol that compresses the headers of packets that are to be routed within the cluster. As a specific example, a compression protocol may compress a UDP/IP header or an L2TPv3/IP header of an Internetwork Operating System ("IOS") packet. Here, the compression protocol may support compression of the following IOS interfaces: Inter-ANRI Signaling (IAS) Interface, which carries signaling of session/paging information between ANRIs for an access terminal; IP Tunneling (IPT) Interface, which carries signaling messages to notify and redirect tunneled traffic based on access terminal mobility and encapsulates the tunneled IP packets to be transmitted between access networks for an access terminal; Link-Layer Tunneling (LLT) Interface, which carries tunneling of link-layer packets to the forward link serving access network and from the reverse link serving access network. The compression protocol may compress the UDP and IP headers of the IAS and IPT signaling interfaces. The compression protocol may compress the L2TPv3 and IP headers of the LLT and IPT data interfaces. In some aspects, compression may facilitate routing across multiple hops (e.g., the IP address or routing address may be read from the compressed header without decompressing the packet). In some implementations, compression between a relay and another relay or an access point is enabled by opening a route to that relay or access point. In the example of FIG. 3, the packet processors 328 and 334 may implement a compression protocol.

As represented by block 506, the compression protocol may append a header to the packet whereby the header may include cluster-specific identifiers to indicate the node of the cluster (e.g., a relay) that is the source of the packet and the node of the cluster (e.g., a relay) that is the destination of the packet. For example, the header of a received packet may include a source address and/or a destination address that corresponds to a network identifier (e.g., ANID) of a node in the cluster as indicated by the identifier list (described above). Thus, the compression protocol may use the network identifier and the identifier list to determine which cluster-specific identifier(s) should be used in the appended header to route the packet within the cluster.

As represented by block 508, the node forwards the packet to a relay in the cluster. As discussed above, a relay management protocol implemented by the node may use the forwarding table to identify the relay to which the packet should be forwarded. For example, if the packet originated at the relay 104 in FIG. 1 and is destined for the relay 110, the node 104 may forward the packet to the relay 108. In the example of FIG. 3, a packet processor 328 or 334 may determine the appropriate destination for the packet and cooperate with an associated transmitter 312 or 316 to transmit the packet.

The relay in the cluster then receives the packet as represented by block 510. Again, in FIG. 3 a packet processor 328 or 334 may cooperate with an associated receiver 314 or 318 to receive the packet.

As represented by block 512 of FIG. 5B, when a node receives a packet (e.g., via a radio link protocol), the relay management protocol may first determine whether the packet includes routing information. If not (e.g., an IPHeaderIncluded field of the appended header is set to "0"), this indicates that the current node is the destination for the packet. In this case, the relay management protocol may send the packet to the compression protocol (e.g., implemented, at least in part, by a packet processor) whereby the packet is decompressed (block 514). The packet may then be forwarded to an upper layer protocol (e.g., at its ultimate destination).

For example, in a case where the packet is destined for a relay, at block 516 the packet processor 334 may process the packet and provide the packet information to an appropriate application running at the node (e.g., at the communication controller 332).

Alternatively, in a case where the packet is destined for an access terminal that is associated with the relay, at block 516 the relay may forward the packet to the access terminal. In the example of FIG. 3, this may involve the communication processor 332 generating an appropriate message and cooperating with the transmitter 320 to send the packet over-the-air to the access terminal.

If the packet did include routing information at block 512 (e.g., the IPHeaderIncluded field of the appended header is set to "1"), the relay management protocol may determine whether the routing information indicates that the current node is the destination for the packet (block 518). This may involve, for example, comparing the cluster-specific identifier of the node (e.g., as maintained in the identifier list) with the destination identifier in the appended header of the packet.

If the current node is the destination for the packet, the operational flow proceeds to blocks 514 and 516. Thus, the packet may be forwarded to the compression protocol so that the packet may be decompressed, and then provided to the node, an associated access terminal, or some other designated endpoint.

If the routing information indicates at block 518 that this node is not the destination for the packet (e.g., the relay management protocol receives a compressed packet that is to be forwarded), the relay management protocol determines the next link for the packet (block 520). Here, the packet processor 334 may use the destination identifier from the appended packet header, as well as the forwarding table of the node to determine the node to which the packet should be routed.

As represented by block 522, the relay management protocol determines whether the next link is the same as the source link (i.e., the link from which the packet was received). This situation may occur, for example, when a downstream relay has been removed from the cluster. In this case, the entry for the relay will have been removed from the forwarding table of the current node. In addition, the forwarding table for the node may specify the uplink as the next link for any identifiers that are not in the forwarding table (e.g., as in Tables 2 and 3).

If the next link is not the same as the source link at block 522, the relay management protocol forwards the packet to the node specified in the forwarding table (block 526). That is, the relay management protocol may forward the packet to the relay management protocol instance on the next link.

If, on the other hand, the next link is the same as the source link at block 522, the relay management protocol may send the packet back to the source link (block 524). For example, if the relay has a route to the relay corresponding to the destination identifier in the appended header, the relay may forward the packet to the appropriate protocol (e.g., IRTP protocol) for that route. Otherwise, the relay management protocol may discard the packet at block 524.

The teachings herein may be implemented in various ways in different implementations. For example, various types of identifiers may be employed, various techniques may be used to distribute identifiers throughout a cluster, and various techniques may be used to route traffic through a cluster based on these identifiers.

In some implementations IP addresses are used as switching tags (e.g., Layer 2 switching tags) to route packets in relay cluster. Here, each relay may be assigned a unique IP address. Each of the relays may then be configured to learn the IP addresses of all of its downstream relays (e.g., all of the relays below it). As a result, the relay is able to switch the packets directly.

In a cluster with multiple relay nodes, a root access point may elect to forward packets, route packets, or do neither. Examples of these scenarios follow. Initially, operations relating to not routing or forwarding are described. Next, operations relating to using Layer 2 forwarding are described. Then, operations relating to using static Layer 3 forwarding are described. Finally, operations relating to using Layer 3 routing are described.

In an implementation where the root access point elects to not route or forward, the following address acquisition sequence may be employed. When a relay wakes up, the relay may send a broadcast DHCP message. The root access point puts it into an L2TP tunnel and forwards it to the access gateway. Return packets come in an L2TP tunnel, transmitted over the air by the root access point.

The following address allocation operations also may be employed. The addresses are allocated by the access gateway or a DHCP server behind the access gateway. Here, the access gateway is the first hop router.

The relay may tunnel packets for relays-in-a-chain in the cluster. For example, with reference to FIG. 1, relay 108 may put packets from the access terminal 114 in a GRE tunnel. Similarly, the relay 104 may put packets from the relay 108 in a GRE tunnel. The packet reaching the root access point 102 thus has two GRE headers. An advantage of this scheme is that it allows each relay to treat anything downstream as an access terminal. A disadvantage of this scheme is that additional GRE headers are added at each hop.

In contrast with the above scheme, the root access point may forward or route packets to a relay. When packets are routed to the root access point, the root access point may own its own subnet. Here, the root access point may act as the default gateway to all relays within its subnet. Addresses to the relays may be allocated from the subnet. The DHCP server may lie elsewhere.

The root access point may run a routing protocol with the access gateway and another access point (e.g., another root access point, not shown in FIG. 1, connected to the network node 116). This routing protocol is run over the backhaul. An advantage of such a scenario is that packets may be routed directly without tunnels. This scenario may be potentially advantageous when a link exists between the root access points. A potential disadvantage of this scheme is that a routing stack may need to be implemented in the root access point.

When a packet is forwarded below the root access point, a packet arriving at the relay 104 may have the IP address of the relay 108. Such a packet may be from an access gateway (e.g., network node 116) or the root access point 102. The relay 104 will see the IP packet (e.g., after detunneling), and the relay 104 needs to send the packet to the relay 108. Three schemes for enabling the relay 104 to determine where to route the packet will now be described in turn. As mentioned above, the first scheme involves Layer 2 (L2) forwarding, the second scheme involves static Layer 3 (L3) forwarding, and the third scheme involves Layer 3 (L3) routing.

In L2 forwarding every node of a relay cluster under a root access point may be part of the same subnet. Here, each node learns the MAC address of every node below it in the tree (each node is assigned its own unique MAC identifier). The MAC addresses may be learned, for example, using a standard L2 bridging protocol (e.g., an L2 protocol such as STP may be run). Implementation of STP may be relatively straightforward since the cluster has a tree topology. L2 forwarding tables may be utilized in this scheme (e.g., implemented in accordance with the teachings herein).

For a DHCP path in this scheme, a DHCP request may be transmitted on all links in a cluster and will eventually reach the root access point. The root access point forwards the request to a DHCP server (at or via the access gateway). A DHCP response (including the new IP address for the node) returns to the subnet and is L2 broadcast until it reaches the destination relay. Thus, this scheme may employ a link-by-link broadcast mechanism.

In some implementations an alternative transport for packets between relays and between a relay and a root access point may be employed. For example, a WiFi mesh routing protocol may be employed in some cases. Four identifiers may be used in these cases: a source identifier, a destination identifier, an interim source identifier, and an interim destination identifier. The interim header may be changed at each hop.

In L3 forwarding every node of a relay cluster under a root access point may be part of the same subnet. These IP addresses are assigned over multiple hops. In this case, each node learns the IP address of every node below it in the tree. As above, this scheme employs a link-by-link broadcast mechanism. In addition, this scheme may essentially run an L2 protocol using IP addresses.

For a DHCP path in this scheme, with reference to FIG. 1, a DHCP request from relay 108 is relayed by relay 104 (DHCP relay agent) to its default router (root access point 102). The root access point forwards the request to the access gateway. Here, the access gateway potentially forwards the request to a DHCP server. A DHCP response including the assigned IP address returns to the current subnet (which maybe owned by the access gateway or by the root access point 102). This scheme is similar to having a DHCP server on another subnet.

Here, a DHCP response packet may be sent via broadcast to the relay 108. Thus, this scheme may include a broadcast mechanism.

An IP packet that reaches the root access point 102 is forwarded to the destination relay. Here, the following node features may be employed. Each node knows all of the IP addresses under it. For example, in a similar manner as discussed above for the cluster-specific identifiers, an IP address table may be maintained and distributed to all of the nodes in the cluster. Also, each node may learn a forwarding table. In some aspects, this scheme essentially employs an L2 forwarding mechanism using IP addresses. Provisions also may be taken to prevent loops in the tables.

In L3 routing, cascading subnets may be provided for every relay. In other words, each relay owns a subnet. The IP address for each new relay may be allocated from the subnet above. That is, children relays may obtain addresses and/or subnets from the subnet of a parent node. This scheme thus involves a longest prefix match. IP routes will be learned. Each relay implements a standard IP routing stack. Packets are forwarded based on IP routing.

A wireless multiple-access communication system may simultaneously support communication for multiple wireless access terminals. Each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 6:
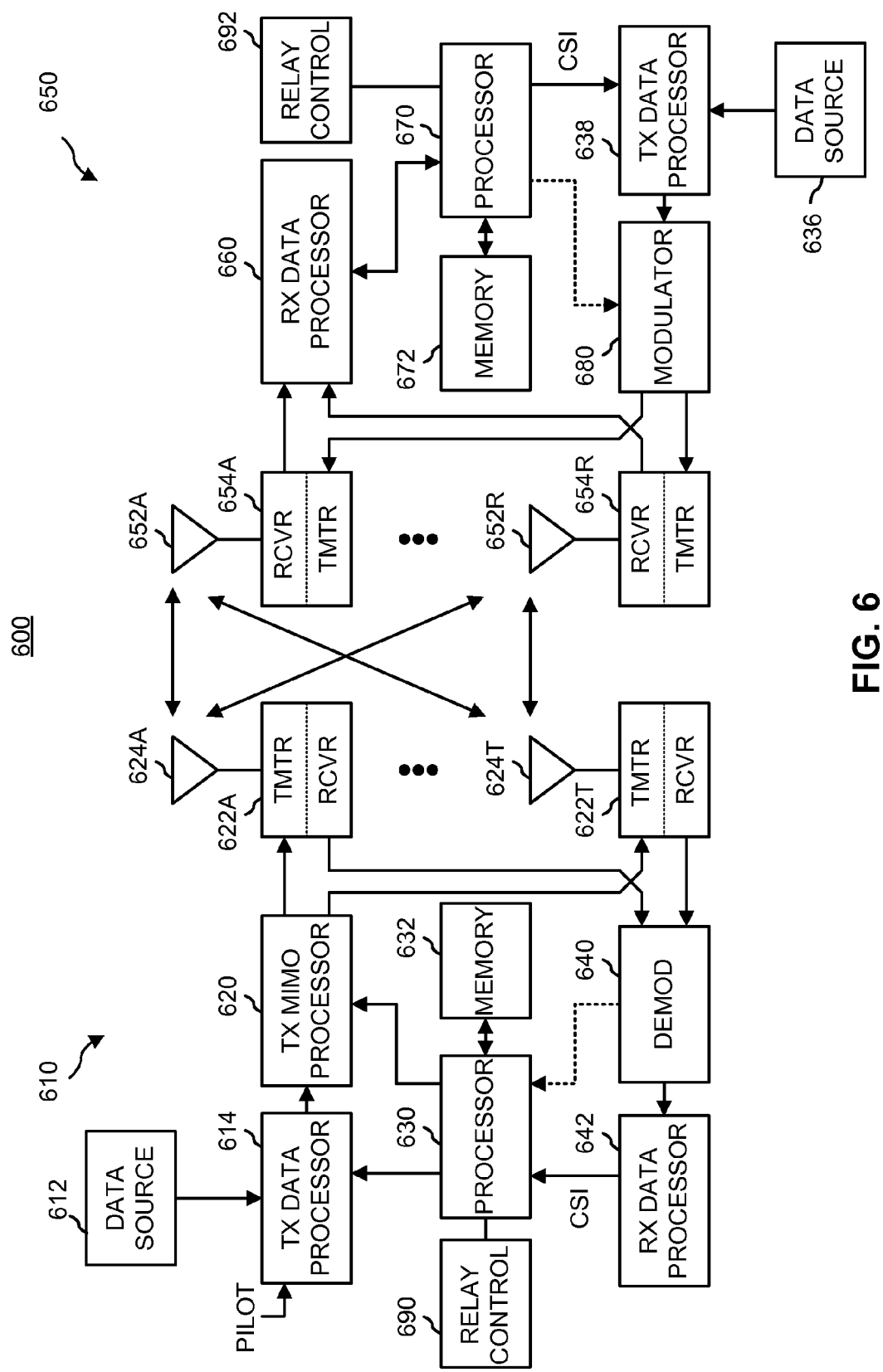
FIG. 6 is a simplified block diagram of several sample aspects of communication components.
Figure 7:
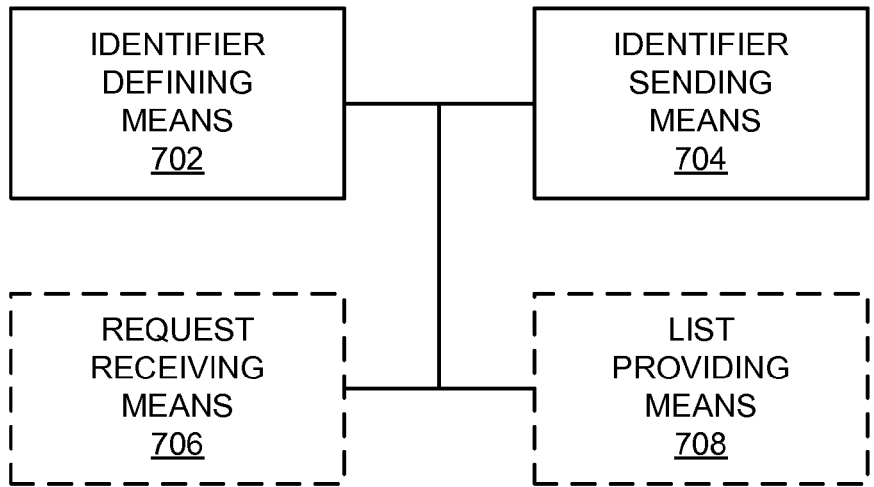
FIGS. 7-10 are simplified block diagrams of several sample aspects of apparatuses configured to provide wireless relay node management as taught herein.
Figure 8:
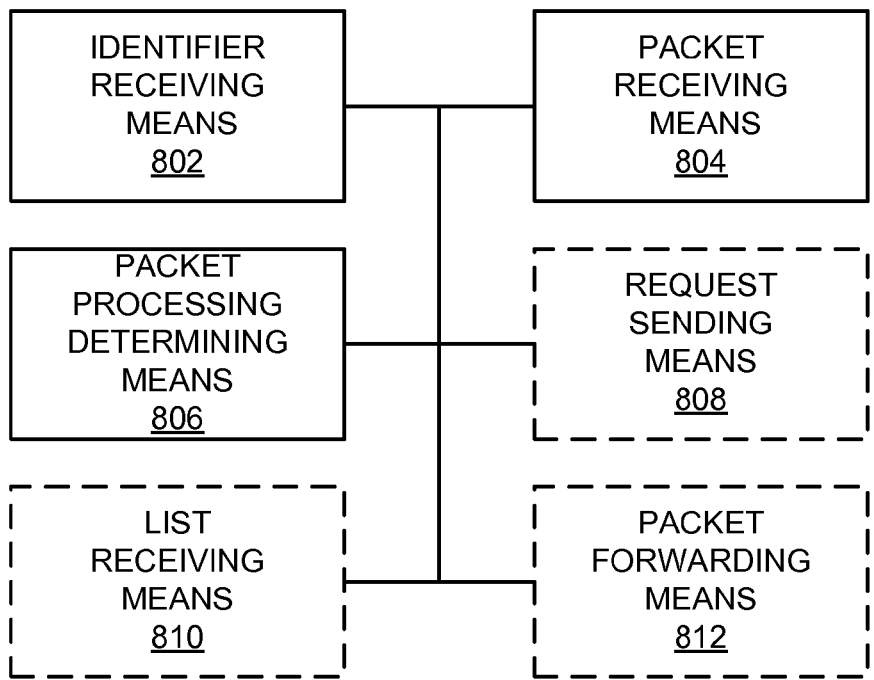
Figure 9:
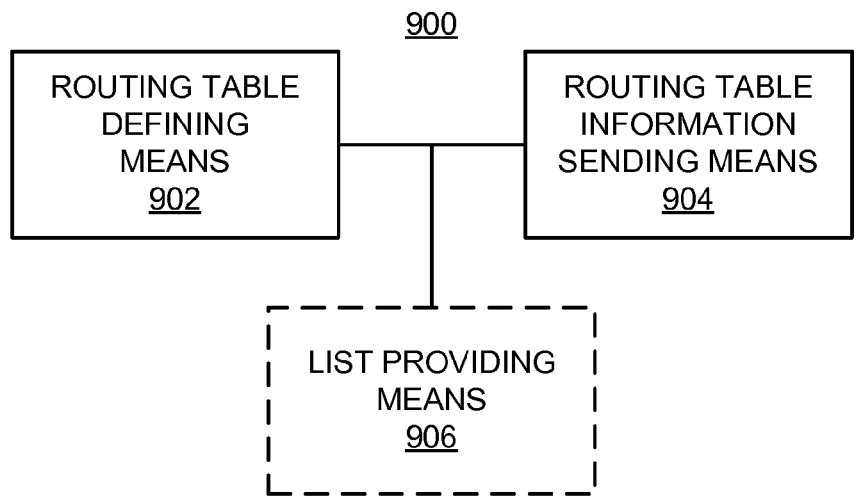
Figure 10:
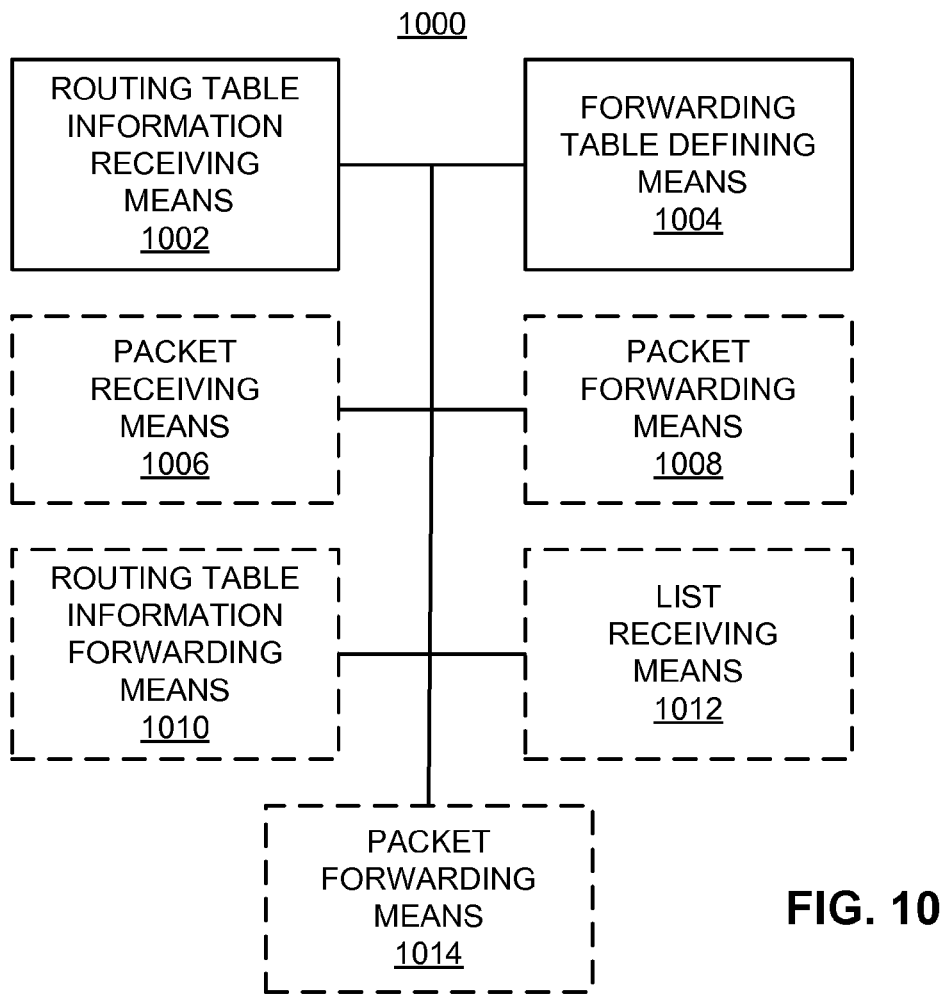

The teachings herein may be incorporated into a node (e.g., a device) employing various components for communicating with at least one other node. FIG. 6 depicts several sample components that may be employed to facilitate communication between nodes. Specifically, FIG. 6 illustrates a wireless device 610 (e.g., an access point) and a wireless device 650 (e.g., an access terminal) of a MIMO system 600. At the device 610, traffic data for a number of data streams is provided from a data source 612 to a transmit ("TX") data processor 614.

In some aspects, each data stream is transmitted over a respective transmit antenna. The TX data processor 614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 630. A data memory 632 may store program code, data, and other information used by the processor 630 or other components of the device 610.

The modulation symbols for all data streams are then provided to a TX MIMO processor 620, which may further process the modulation symbols (e.g., for OFDM). The TX MIMO processor 620 then provides $N_T$ modulation symbol streams to $N_T$ transceivers ("XCVR") 622A through 622T. In some aspects, the TX MIMO processor 620 applies beam-forming weights to the symbols of the data streams and to the antenna from which the symbol is being transmitted.

Each transceiver 622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 622A through 622T are then transmitted from $N_T$ antennas 624A through 624T, respectively.

At the device 650, the transmitted modulated signals are received by $N_R$ antennas 652A through 652R and the received signal from each antenna 652 is provided to a respective transceiver ("XCVR") 654A through 654R. Each transceiver 654 conditions (e.g., filters, amplifies, and downconverts) a respective received signal, digitizes the conditioned signal to provide samples, and further processes the samples to provide a corresponding "received" symbol stream.

A receive ("RX") data processor 660 then receives and processes the $N_R$ received symbol streams from $N_R$ transceivers 654 based on a particular receiver processing technique to provide $N_T$ "detected" symbol streams. The RX data processor 660 then demodulates, deinterleaves, and decodes each detected symbol stream to recover the traffic data for the data stream. The processing by the RX data processor 660 is complementary to that performed by the TX MIMO processor 620 and the TX data processor 614 at the device 610.

A processor 670 periodically determines which pre-coding matrix to use (discussed below). The processor 670 formulates a reverse link message comprising a matrix index portion and a rank value portion. A data memory 672 may store program code, data, and other information used by the processor 670 or other components of the device 650.

The reverse link message may comprise various types of information regarding the communication link and/or the received data stream. The reverse link message is then processed by a TX data processor 638, which also receives traffic data for a number of data streams from a data source 636, modulated by a modulator 680, conditioned by the transceivers 654A through 654R, and transmitted back to the device 610.

At the device 610, the modulated signals from the device 650 are received by the antennas 624, conditioned by the transceivers 622, demodulated by a demodulator ("DE-MOD") 640, and processed by a RX data processor 642 to extract the reverse link message transmitted by the device 650. The processor 630 then determines which pre-coding matrix to use for determining the beam-forming weights then processes the extracted message.

FIG. 6 also illustrates that the communication components may include one or more components that perform relay control operations as taught herein. For example, a relay control component 690 may cooperate with the processor 630 and/or other components of the device 610 to send/receive signals to/from another device (e.g., device 650) as taught herein. Similarly, a relay control component 692 may cooperate with the processor 670 and/or other components of the device 650 to send/receive signals to/from another device (e.g., device 610). It should be appreciated that for each device 610 and 650 the functionality of two or more of the described components may be provided by a single component. For example, a single processing component may provide the functionality of the relay control component 690 and the processor 630 and a single processing component may provide the functionality of the relay control component 692 and the processor 670.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (IxRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 7-10, apparatuses 700-1000 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof The functionality of these blocks also may be implemented in some other manner as taught herein. In some aspects one or more of the dashed blocks in FIGS. 7-10 are optional.

The apparatuses 700-1000 may include one or more modules that may perform one or more of the functions described above with regard to various figures. For example, an identifier defining means 702 may correspond to, for example, an identifier determiner as discussed herein. An identifier sending means 704 may correspond to, for example, a transmitter as discussed herein. A request receiving means 706 may correspond to, for example, a request processor as discussed herein. A list providing means 708 may correspond to, for example, a list definer as discussed herein. An identifier receiving means 802 may correspond to, for example, an identifier controller as discussed herein. A packet receiving means 804 may correspond to, for example, a receiver as discussed herein. A packet processing determining means 806 may correspond to, for example, a packet processor as discussed herein. A request sending means 808 may correspond to, for example, a request generator as discussed herein. A list receiving means 810 may correspond to, for example, a list controller as discussed herein. A packet forwarding means 812 may correspond to, for example, a packet processor as discussed herein. A routing table defining means 902 may correspond to, for example, a routing table definer as discussed herein. A routing table information sending means 904 may correspond to, for example, a transmitter as discussed herein. A list providing means 906 may correspond to, for example, a list definer as discussed herein. A routing table information receiving means 1002 may correspond to, for example, a routing table controller as discussed herein. A forwarding table defining means 1004 may correspond to, for example, a forwarding table definer as discussed herein. A packet receiving means 1006 may correspond to, for example, a receiver as discussed herein. A packet forwarding means 1008 may correspond to, for example, a packet processor as discussed herein. A routing table information forwarding means 1010 may correspond to, for example, a routing table controller as discussed herein. A list receiving means 1012 may correspond to, for example, a list controller as discussed herein. A packet forwarding means 1014 may correspond to, for example, a packet processor as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
defining an identifier for a wireless relay node, wherein the identifier is defined for use within a set of wireless relay nodes to uniquely identify the wireless relay node within the set;
sending the identifier to the wireless relay node; and
providing a list to each wireless relay node in the set, wherein the list comprises the identifiers of each wireless relay node in the set.

2. The method of claim 1, wherein the identifier is associated with a second identifier that uniquely identifies the wireless relay node within a network.

3. The method of claim 2, wherein the second identifier for the wireless relay node is an Internet Protocol address of the wireless relay node.

4. The method of claim 1, wherein the identifier is defined to facilitate forwarding compressed packets between the wireless relay nodes of the set.

5. The method of claim 1, wherein a single root access point provides a network attachment point for the wireless relay nodes of the set.

6. The method of claim 1, wherein each of the wireless relay nodes of the set use a first type of wireless technology to provide access for access terminals and to provide backbone connectivity.

7. The method of claim 1, wherein the identifier is defined in conjunction with the wireless relay node connecting to another wireless relay node of the set.

8. The method of claim 1, further comprising receiving a request for the identifier from the wireless relay node, wherein:
the identifier is defined in response to the receipt of the request; and
the request comprises another identifier of the wireless relay node, wherein the another identifier uniquely identifies the wireless relay node within a network.

9. An apparatus for communication, comprising:
an identifier definer configured to define an identifier for a wireless relay node, wherein:
the identifier is defined for use within a set of wireless relay nodes to uniquely identify the wireless relay node within the set;
a transmitter configured to send the identifier to the wireless relay node; and
a list definer configured to define a list comprising the identifiers of each wireless relay node in the set, wherein the transmitter is further configured to send the list to each wireless relay node in the set.

10. The apparatus of claim 9, wherein the identifier is associated with a second identifier that uniquely identifies the wireless relay node within a network.

11. The apparatus of claim 10, wherein the second identifier for the wireless relay node is an Internet Protocol address of the wireless relay node.

12. The apparatus of claim 9, wherein the identifier is defined to facilitate forwarding compressed packets between the wireless relay nodes of the set.

13. The apparatus of claim 9, wherein a single root access point provides a network attachment point for the wireless relay nodes of the set.

14. The apparatus of claim 9, wherein each of the wireless relay nodes of the set use a first type of wireless technology to provide access for access terminals and to provide backbone connectivity.

15. The apparatus of claim 9, wherein the identifier is defined in conjunction with the wireless relay node connecting to another wireless relay node of the set.

16. The apparatus of claim 9, further comprising a request processor configured to receive a request for the identifier from the wireless relay node, wherein:
the identifier is defined in response to the receipt of the request; and
the request comprises another identifier of the wireless relay node, wherein the another identifier uniquely identifies the wireless relay node within a network.

17. An apparatus for communication, comprising:
means for defining an identifier for a wireless relay node, wherein:
the identifier is defined for use within a set of wireless relay nodes to uniquely identify the wireless relay node within the set;
means for sending the identifier to the wireless relay node; and
means for providing a list to each wireless relay node in the set, wherein the list comprises the identifiers of each wireless relay node in the set.

18. The apparatus of claim 17, wherein the identifier is associated with a second identifier that uniquely identifies the wireless relay node within a network.

19. The apparatus of claim 18, wherein the second identifier for the wireless relay node is an Internet Protocol address of the wireless relay node.

20. The apparatus of claim 17, wherein the identifier is defined to facilitate forwarding compressed packets between the wireless relay nodes of the set.

21. The apparatus of claim 17, wherein a single root access point provides a network attachment point for the wireless relay nodes of the set.

22. The apparatus of claim 17, wherein each of the wireless relay nodes of the set use a first type of wireless technology to provide access for access terminals and to provide backbone connectivity.

23. The apparatus of claim 17, wherein the identifier is defined in conjunction with the wireless relay node connecting to another wireless relay node of the set.

24. The apparatus of claim 17, further comprising means for receiving a request for the identifier from the wireless relay node, wherein:
the identifier is defined in response to the receipt of the request; and
the request comprises another identifier of the wireless relay node, wherein the another identifier uniquely identifies the wireless relay node within a network.

25. A computer-program product, comprising:
non-transitory computer-readable medium comprising code for causing a computer to:
define an identifier for a wireless relay node, wherein:
the identifier is defined for use within a set of wireless relay nodes to uniquely identify the wireless relay node within the set;
send the identifier to the wireless relay node; and
provide a list to each wireless relay node in the set, wherein the list comprises the identifiers of each wireless relay node in the set.

26. The computer-program product of claim 25, wherein the identifier is associated with a second identifier that uniquely identifies the wireless relay node within a network.

27. The computer-program product of claim 26, wherein the second identifier for the wireless relay node is an Internet Protocol address of the wireless relay node.

28. A method of communication, comprising:
receiving an identifier for a first wireless relay node, wherein:
the identifier is defined for use within a set of wireless relay nodes to uniquely identify the first wireless relay node within the set;
receiving a list of identifiers for each wireless relay node in the set;
receiving a packet from a second wireless relay node of the set; and
determining how to process the received packet based on the identifier and the list.

29. The method of claim 28, wherein:
the packet comprises a compressed header and a wireless relay node identifier; and
the determination comprises determining whether the wireless relay node identifier identifies the first wireless relay node.

30. The method of claim 29, wherein the determination comprises electing to decompress the packet if the wireless relay node identifier identifies the first wireless relay node.

31. The method of claim 29, wherein the determination comprises electing to forward the packet if the wireless relay node identifier does not identify the first wireless relay node.

32. The method of claim 28, wherein the identifier is associated with a second identifier that uniquely identifies the first wireless relay node within a network.

33. The method of claim 32, wherein the second identifier for the first wireless relay node is an Internet Protocol address of the first wireless relay node.

34. The method of claim 28, wherein a single root access point provides a network attachment point for the wireless relay nodes of the set.

35. The method of claim 28, wherein each of the wireless relay nodes of the set use a first type of wireless technology to provide access for access terminals and to provide backbone connectivity.

36. The method of claim 28, the identifier is received in conjunction with the first wireless relay node connecting to the second wireless relay node.

37. The method of claim 28, further comprising sending a request for the identifier, wherein:
the request comprises another identifier of the first wireless relay node; and
the another identifier uniquely identifies the first wireless relay node within a network.

38. An apparatus for communication, comprising:
an identifier controller configured to receive an identifier for a first wireless relay node, wherein:
the identifier is defined for use within a set of wireless relay nodes to uniquely identify the first wireless relay node within the set;
a list controller configured to receive a list of identifiers for each wireless relay node in the set;
a receiver configured to receive a packet from a second wireless relay node of the set; and
a packet processor configured to determine how to process the received packet based on the identifier and the list.

39. The apparatus of claim 38, wherein:
the packet comprises a compressed header and a wireless relay node identifier; and
the determination comprises determining whether the wireless relay node identifier identifies the first wireless relay node.

40. The apparatus of claim 38, wherein the identifier is associated with a second identifier that uniquely identifies the first wireless relay node within a network.

41. The apparatus of claim 40, wherein the second identifier for the first wireless relay node is an Internet Protocol address of the first wireless relay node.

42. The apparatus of claim 38, further comprising a request generator configured to send a request for the identifier, wherein:
the request comprises another identifier of the first wireless relay node; and
the another identifier uniquely identifies the first wireless relay node within a network.

43. An apparatus for communication, comprising:
means for receiving an identifier for a first wireless relay node, wherein:
the identifier is defined for use within a set of wireless relay nodes to uniquely identify the first wireless relay node within the set;
means for receiving a list of identifiers for each wireless relay node in the set;
means for receiving a packet from a second wireless relay node of the set; and
means for determining how to process the received packet based on the identifier and the list.

44. The apparatus of claim 43, wherein:
the packet comprises a compressed header and a wireless relay node identifier; and
the determination comprises determining whether the wireless relay node identifier identifies the first wireless relay node.

45. The apparatus of claim 43, wherein the identifier is associated with a second identifier that uniquely identifies the first wireless relay node within a network.

46. The apparatus of claim 45, wherein the second identifier for the first wireless relay node is an Internet Protocol address of the first wireless relay node.

47. The apparatus of claim 43, further comprising means for sending a request for the identifier, wherein:
the request comprises another identifier of the first wireless relay node; and
the another identifier uniquely identifies the first wireless relay node within a network.

48. A computer-program product, comprising:
non-transitory computer-readable medium comprising code for causing a computer to:
receive an identifier for a first wireless relay node, wherein:
the identifier is defined for use within a set of wireless relay nodes to uniquely identify the first wireless relay node within the set;
receive a list of identifiers for each wireless relay node in the set;
receive a packet from a second wireless relay node of the set; and
determine how to process the received packet based on the identifier and the list.

49. The computer-program product of claim 48, wherein:
the packet comprises a compressed header and a wireless relay node identifier; and
the determination comprises determining whether the wireless relay node identifier identifies the first wireless relay node.

50. The computer-program product of claim 48, wherein the identifier is associated with a second identifier that uniquely identifies the first wireless relay node within a network.

51. The computer-program product of claim 50, wherein the second identifier for the first wireless relay node is an Internet Protocol address of the first wireless relay node.

52. The computer-program product of claim 48, wherein:
the non-transitory computer-readable medium further comprises code for causing the computer to send a request for the identifier;
the request comprises another identifier of the first wireless relay node; and
the another identifier uniquely identifies the first wireless relay node within a network.

* * * * *